US007999166B2

(12) United States Patent
Choi et al.

(10) Patent No.: US 7,999,166 B2
(45) Date of Patent: Aug. 16, 2011

(54) VIBRATION AUTHORING TOOL, VIBRATION AUTHORING METHOD, AND STORAGE MEDIUM RECORDED WITH THE SAME

(75) Inventors: Seung Moon Choi, Pohang (KR); Jong Hyun Ryu, Daejon (KR); Jae Bong Lee, Yongin (KR)

(73) Assignee: Industry-Academic Cooperation Foundation, Pohang University of Science, Pohang (KR)

( * ) Notice: Subject to any disclaimer, the term of this patent is extended or adjusted under 35 U.S.C. 154(b) by 0 days.

(21) Appl. No.: 12/742,429

(22) PCT Filed: Mar. 13, 2009

(86) PCT No.: PCT/KR2009/001259
§ 371 (c)(1), (2), (4) Date: May 11, 2010

(87) PCT Pub. No.: WO2010/104226
PCT Pub. Date: Sep. 16, 2010

(65) Prior Publication Data

US 2011/0048213 A1 Mar. 3, 2011

(51) Int. Cl.
*G09B 15/00* (2006.01)
*G09B 15/02* (2006.01)
*G10H 1/00* (2006.01)

(52) U.S. Cl. ............ 84/477 R; 84/600; 84/609; 84/612; 84/616; 84/649; 84/652; 84/654; 84/723

(58) Field of Classification Search ........................ None
See application file for complete search history.

(56) References Cited

U.S. PATENT DOCUMENTS

| | | | | |
|---|---|---|---|---|
| 4,594,930 | A | 6/1986 | Murakami | |
| 7,893,337 | B2 * | 2/2011 | Lenz | 84/477 R |
| 2004/0069123 | A1 | 4/2004 | Becker et al. | |
| 2008/0017014 | A1 | 1/2008 | Suzuki | |
| 2008/0314228 | A1 * | 12/2008 | Dreyfuss et al. | 84/477 R |
| 2010/0313736 | A1 * | 12/2010 | Lenz | 84/477 R |

FOREIGN PATENT DOCUMENTS

KR 1020000072127 A 12/2000

OTHER PUBLICATIONS

International Search Report for PCT/KR2009/001259 filed Mar. 13, 2009.
Written Opinion of the International Searching Authority PCT/KR2009/001259 filed Mar. 13, 2009.

* cited by examiner

*Primary Examiner* — Marlon T Fletcher

(57) ABSTRACT

The present invention relates to a vibration authoring tool, a vibration authoring method, and a storage medium recorded with the same. To this end, the present invention provides a vibration authoring tool, including: a scale defining unit that defines a scale by controlling the frequencies, amplitudes, and waveforms of the vibration; a clef defining unit that defines a clef by corresponding each staff line of a vibration score to a portion of the frequencies and corresponding head numbers of each note to a portion of the amplitudes; a score authoring unit that authors a score by inputting symbols including notes, rests, and dynamics in the vibration score; and a reproducing unit that reproduces the score authored through the score authoring unit.

10 Claims, 4 Drawing Sheets

[Figure 1]
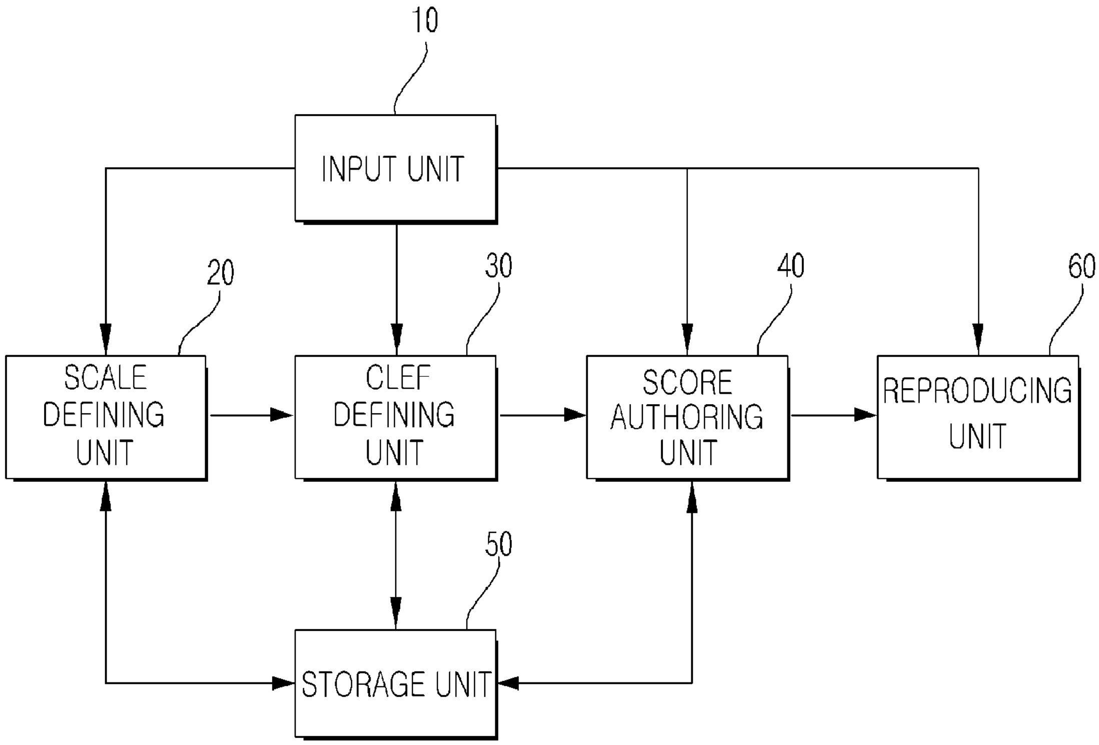
[Figure 2]
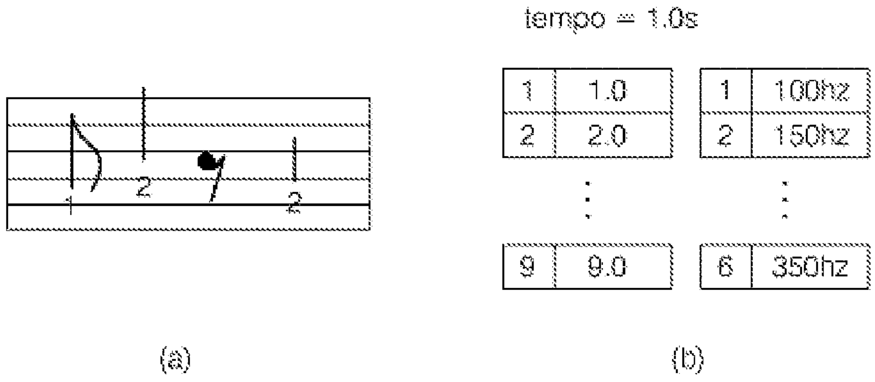

[Figure 3]
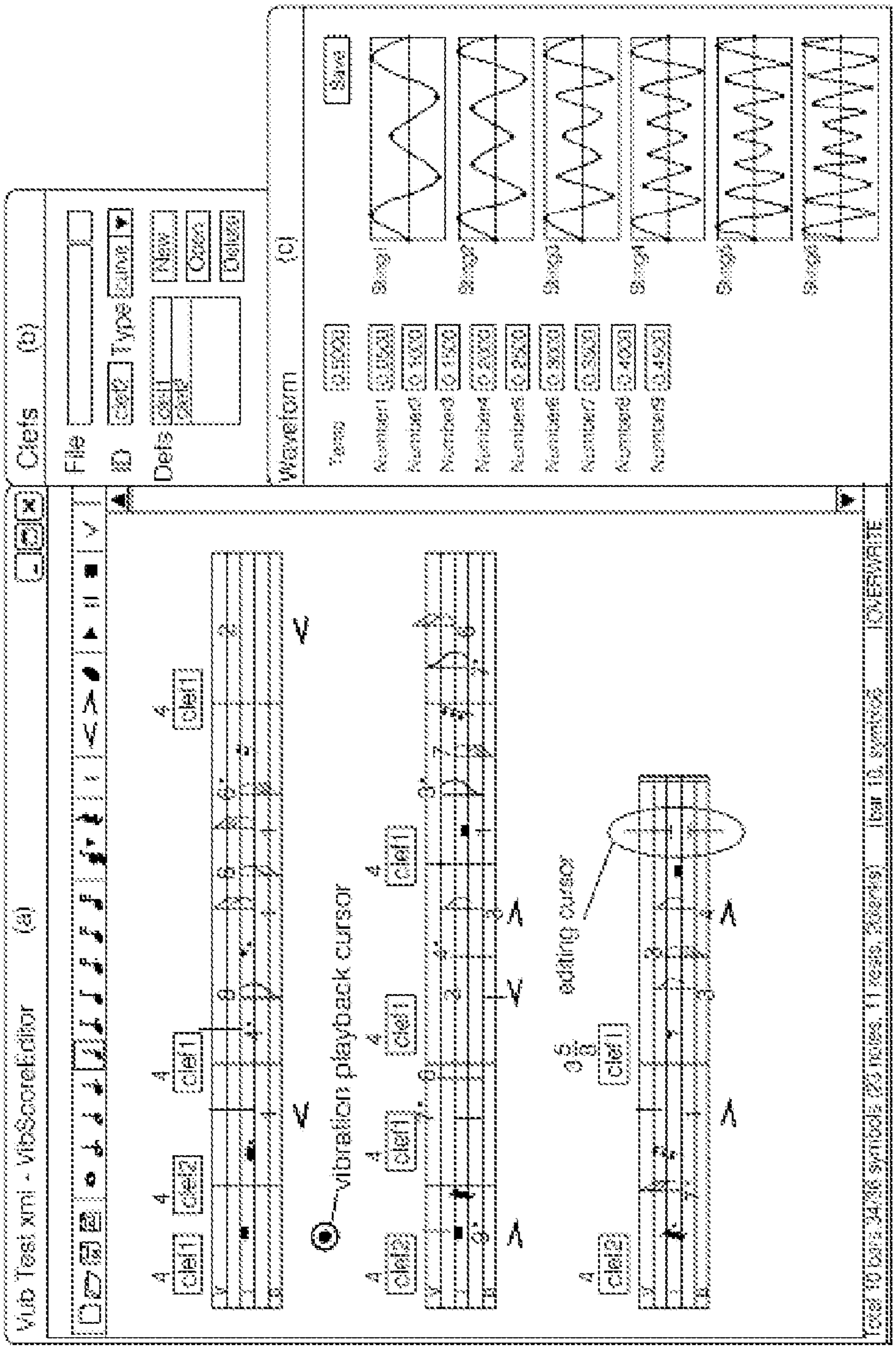

[Figure 4]
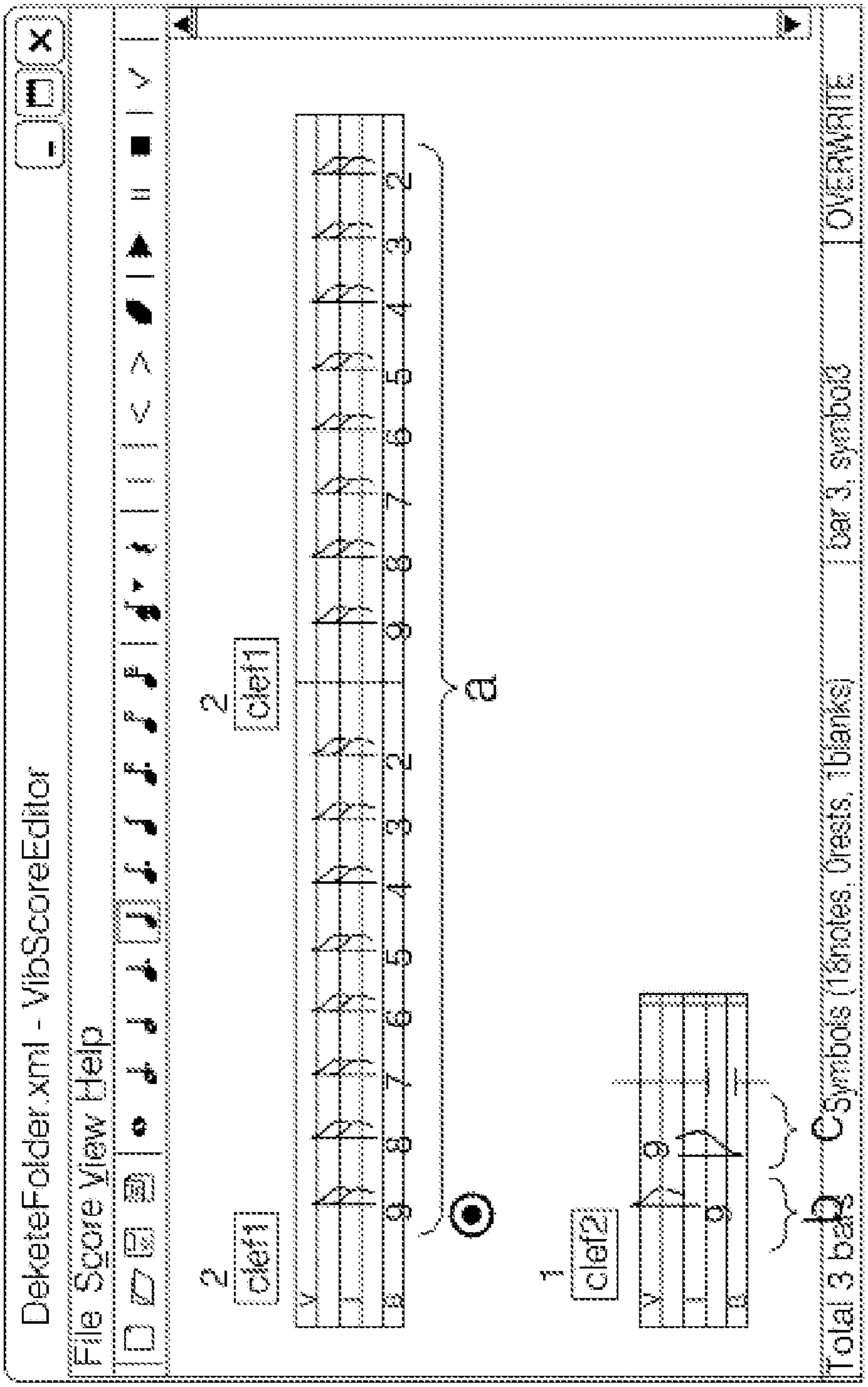

[Figure 5]
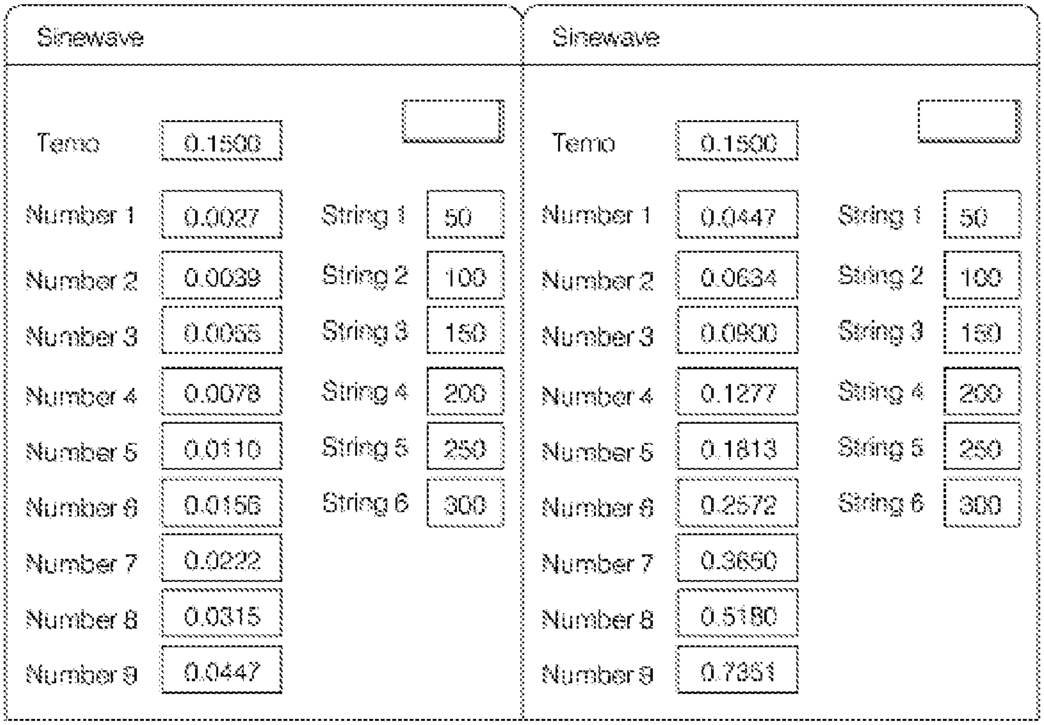
[Figure 6]
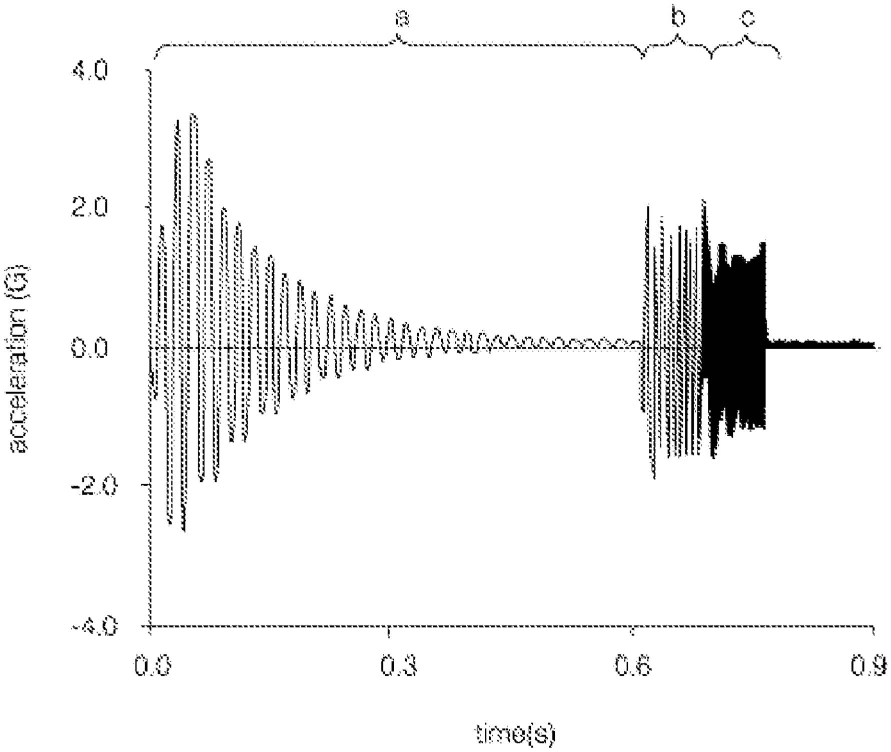

VIBRATION AUTHORING TOOL, VIBRATION AUTHORING METHOD, AND STORAGE MEDIUM RECORDED WITH THE SAME

TECHNICAL FIELD

The present invention relates to a vibration authoring tool, a vibration authoring method, and a storage medium recorded with the same. More specifically, the present invention relates to a vibration authoring tool capable of facilitating learning, easily and quickly authoring vibration and easily grasping three-dimensional information on frequencies, amplitudes, and rhythms that author the vibration authoring at a glance by configuring a graphic user interface that facilitates intuitive recognition, thereby simply designing a pattern by adding/deleting notes or rests to and from a score as well as easily inferring the effect of the generated vibration due to the expression in a score form, a vibration authoring method, and a storage medium recorded with the same.

BACKGROUND ART

A haptic technology provides various information on a virtual or real environment to a user through tactile and kinesthetic. The word ‘Haptic’ means tactile in Greek and is a concept that includes both the tactile and kinesthetic. Tactile provides information on geometry, roughness, temperature, sliding, etc., of a contacting surface through a cutaneous sense and kinesthetic provides information on the entire contacting strength, flexibility, weight, etc., by physiological acceptance sense through the muscle, bone, and articulation.

Among haptic technologies, vibrotactile, in particular, can provide useful information to the user when visual information and auditory information are limited. The vibrotactile technology has been used in virtual reality and game fields. In particular, the vibrotactile technology has been used for human-computer interaction (HCI) in a structured vibrotactile form. Recently, research in using a vibrotactile actuator such as a piezoelectric actuator for mobile devices has been conducted.

A study on a software tool to facilitate the authoring and evaluation of the vibrotactile pattern has been needed, along with a study on a hardware field to provide the vibrotactile technology. To this end, authoring tools such as Hapticon Editor, Haptic Icon Prototype, and VibeTonz studio have been developed. However, these authoring tools are limited in that they are similar to sound forming programs capable of directly controlling sound waveforms. The methods that are applied to the authoring tools provide flexibility in forming the waveforms, but do not provide intuition to the user when authoring music or audio icons and consume much time.

DISCLOSURE

Technical Problem

The present invention proposes to solve the above problems. It is an object of the present invention to provide a vibration authoring tool capable of facilitating learning and easily and quickly authoring vibration and grasping three-dimensional information on frequencies, amplitudes, and rhythms that author the vibration authoring at a glance by configuring a graphic user interface that facilitates intuitive recognition in order to simply design a pattern by adding/deleting notes or rests to and from a score as well as easily inferring the effect of the generated vibration due to the expression in a score form, a vibration authoring method, and a storage medium recorded with the same.

Technical Solution

In order to achieve the above object, according to the present invention, there is provided a vibration authoring tool, including: a scale defining unit that defines a scale by controlling the frequencies, amplitudes, and waveforms of the vibration; a clef defining unit that defines a clef by corresponding each staff line of a vibration score to a portion of the frequencies and corresponding head numbers of each note to a portion of the amplitudes; a score authoring unit that authors a score by inputting symbols including notes, rests, and dynamics in the vibration score; and a reproducing unit that reproduces the score authored through the score authoring unit.

The vibration authoring tool may further include a storage unit that stores authoring results of the score authoring unit in an eXtensible Markup Language (XML) file format.

The clef defining unit may define a tempo that represents a temporal length of a quarter note by a second unit.

The score authoring unit may represent the amplitudes of the vibration through the head numbers of the notes, the frequencies of the vibration depending on the positions on the staff lines of the notes, and the rhythms of the vibration through the notes and rests.

The score authoring unit may include a clef designating unit that designates any one of the clefs that are defined in the clef defining unit.

According to the present invention, there is provided a vibration authoring method, including: (a) defining a scale by controlling the frequencies, amplitudes, and waveforms of the vibration; (b) defining a clef by corresponding selected frequencies to each staff line of a vibration score by selecting a portion of the frequencies and the amplitudes that configure the scale defined through step (a) and corresponding the selected amplitudes to head numbers of each note; and (c) authoring a score by designating specific clefs of the clefs defined through step (b) and by inputting symbols including notes, rests, and dynamic marks in the vibration score.

The vibration authoring method may further include (d) reproducing the score authored through step (c).

The vibration authoring method may further include storing the scale defined through step (a), the clef defined through step (b), and the score authored through step (c) in an XML file format.

Step (c) may represent the amplitudes of the vibration through the head numbers of the notes, the frequencies of the vibration depending on the positions on the staff lines of the notes, and the rhythms of the vibration through the notes and rests.

ADVANTAGEOUS EFFECTS

With the present invention, it can allow someone with a basic knowledge on music to facilitate the learning and easily and quickly author the vibration by authoring the vibration score using the form of the music score and can easily grasp the three-dimensional information on the frequencies, amplitudes, and rhythms that authors the vibration at a glance by configuring the graphic user interface that facilitates the intuitive recognition, thereby simply designing the pattern by adding/deleting the notes or the rests to and from the score as well as easily inferring the effect of the generated vibration due to the expression of the score form.

In addition, with the present invention, it can store the products in the XML file to secure the reproductivity and extensibility and support the various vibration actuators to perform the realistic reproduction in real time.

DESCRIPTION OF DRAWINGS

FIG. 1 is a block diagram of a vibration authoring tool according to an exemplary embodiment of the present invention;

FIG. 2 is a conceptual diagram showing a vibration score and a clef according to an exemplary embodiment of the present invention;

FIG. 3 is a conceptual diagram showing a user interface of the vibration authoring tool according to an exemplary embodiment of the present invention;

FIG. 4 is a conceptual diagram showing the vibration score authored by the vibration authoring tool according to an exemplary embodiment of the present invention;

FIG. 5 is a conceptual diagram of the clef to generate the vibration score of FIG. 4; and FIG. 6 is a graph showing the vibration score of FIG. 4 as waveforms.

BEST MODE

Hereinafter, preferred embodiments of the present invention will be described in detail with reference to the accompanying drawings. First of all, it is to be noted that in giving reference numerals to elements of each drawing, like reference numerals refer to like elements even though like elements are shown in different drawings. Further, in describing the present invention, well-known functions or construction will not be described in detail since they may unnecessarily obscure the understanding of the present invention. Hereinafter, the preferred embodiment of the present invention will be described, but it will be understood to those skilled in the art that the spirit and scope of the present invention are not limited thereto and various modifications and changes can be made.

FIG. 1 is a block diagram of a vibration authoring tool according to an exemplary embodiment of the present invention.

Referring to FIG. 1, the vibration authoring tool according to an exemplary embodiment of the present invention is configured to include an input unit 10, a scale defining unit 20, a clef defining unit 30, a score authoring unit 40, a storage unit 50, and a reproducing unit 60.

The input unit 10 performs an input process to the scale defining unit 20, the clef defining unit 30, the score authoring unit 40, and the reproducing unit 60 through input devices such as a screen, a mouse, a keyboard, etc. As one example, the input unit 10 inputs desired data through the keyboard or the mouse by a graphic user interface (GUI) or select data among given data, as shown in FIG. 3.

The scale defining unit 20 controls frequencies, amplitudes, and waveforms of vibration to define a scale. Similar to a major scale and a minor scale of the music score, a scale may also be defined in a vibration score. In the present invention, it is defined that elements, such as the frequencies, amplitudes, waveforms that configure the vibration, configure the scale.

Therefore, frequency groups, amplitude groups, and waveform groups that form one scale is defined in the scale defining unit 20.

For example, in C-D-E-F-G-A-B notes that are configured as one octave, a frequency of the C note is set to 220 Hz and one frequency array is configured by controlling a frequency interval between the respective notes. As another scale configuring method, the frequency of the C note is set to 330 Hz and the frequency interval between the respective notes become narrower, thereby making it possible to configure another frequency array. The scale defined as described above configures the frequency groups and selects a portion of the frequency groups in the clef defining unit to be described below, which is used to author the vibration score.

The clef defining unit 30 is a unit that optionally selects a portion in the scale defined in the scale defining unit 20 to define a clef that can be immediately applied during the generation of the vibration score. The clef defining unit 30 is a unit that is used to express the scale defined in the scale defining unit 20 on the vibration score. FIG. 2 shows one example of the vibration score and the clef.

As shown in FIG. 2(*a*), the vibration score has a format that adopts the music score as a metaphor. The music score consists of N staff lines and notes are positioned only on the staff lines like other tab scores (TAB). Further, the amplitudes of the vibration are represented on the head of the note by using a number. Meanwhile, the head numbers of the notes may represent the waveforms (note control) of the vibration. In addition, the vibration score represents the rhythms through the notes and the rests similar to the music score.

FIG. 2(*a*) shows the vibration score that consists of 6 staff lines. The vibration score of FIG. 2(*a*) is defined by the clef of FIG. 2(*b*). Numbers from 1 to 9 that are shown at the left of FIG. 2(*b*) correspond to the head numbers of the vibration score and represent the amplitudes of the vibration. For example, head number 1 of a first note represents an amplitude of 1.0 and head number 2 of a second note represents an amplitude of 2.0 in the vibration score of FIG. 2(*a*). Numbers from 1 to 6 that are shown at the right of FIG. 2(*b*) represent frequencies corresponding to each staff line of the vibration score. For example, in the vibration score of FIG. 2(*a*), the first staff line from below represents a frequency of 100 Hz, the second staff line represents a frequency of 150 Hz, and the sixth staff line represents a frequency of 350 Hz.

In addition, the clef defining unit 30 defines a tempo that represents a temporal length of a quarter note by a second unit. In FIG. 2(*b*), the tempo means that the vibration corresponding to the quarter note is continued for 1 second. Therefore, in FIG. 2(*a*), the first note is a quaver, such that the vibration having an amplitude of 1.0 and a frequency of 150 Hz is continued for 0.5 second. The second note is a quarter note, such that the vibration having an amplitude of 2.0 and the frequency of 200 Hz is continued for 1 second. If the vibration signal is represented by a sine waveform of $y=A\sin(2\pi Ft)$, A represents an amplitude, F represents a frequency, and t represents time. Therefore, the vibration score of FIG. 2(*a*) is represented by the following equation.

$$y(t)=\begin{cases}1.0\cdot\sin(2\pi\cdot150\cdot t), & 0.0\le t<0.5\\ 2.0\cdot\sin(2\pi\cdot200\cdot t), & 0.5\le t<1.5\\ 0.0, & 1.5\le t<2.0\\ 2.0\cdot\sin(2\pi\cdot100\cdot t), & 2.0\le t<4.0\end{cases}\qquad\text{[Equation 1]}$$

That is, the clef defining unit 30 corresponds to each staff line of the vibration score to the corresponding frequencies and the head numbers of each of the notes to the corresponding amplitude to generate the clef. At this time, the clef can be generated in plural. As described above, the specific clef among the plurality of generated clefs is selected, thereby making it possible to author the vibration score. For example, when intending to author the vibration that is increasingly smaller, Clef 1 defines that head numbers from 1 to 9 have amplitudes of 0.0027 to 0.0447 and Clef 2 defines that head numbers from 1 to 9 have amplitudes of 0.0047 to 0.7351, such that the vibration that is sequentially reduced from an amplitude of 0.7351 to an amplitude of 0.0027 can be represented by combining the two clefs.

The score authoring unit 40 is a unit that inputs symbols including the notes, the rests, the dynamics to the vibration score and authors the score. FIG. 3 shows one example of the graphic user interface that can author scores.

The symbols used in the score authoring unit 40 are as follows. The clef changes the frequency groups corresponding to each staff line and a bar is configured so that one bar includes four quarter notes in the case of a four-quarter beats. The notes and the rests form the rhythm, the tempo represents the temporal length of the quarter note, and the dynamics are represented by crescendos and decrescendos. The scale has different frequency groups to induce different feelings and the note has different waveforms of the vibration to also induce different feelings.

To this end, the score authoring unit 40 includes the clef designation unit that designates any one of the clefs that are defined in the clef defining unit 30. For example, the vibration score is authored by selecting any one of the Clef 1 and Clef 2 in FIG. 3(*b*). At this time, in an example of FIG. 3, the clef is designated for each bar but the unit that designates the clef may be set differently from the foregoing.

The storage unit 50 is a unit that stores the results of the scale defining unit 20, the clef defining unit 30, and the score authoring unit 40. At this time, the storage unit 50 preferably stores each product in an eXtensible Markup Language (XML) file format. Through this, the storage unit 50 can repeatedly reuse the calculated products as well as expansively reproduce through extensibility.

The reproducing unit 60 is a unit that reproduces the score authored by the score authoring unit 40.

The vibration pattern designed in the score authoring unit 40 is reproduced by the reproducing unit 60 to perform the continuous authoring and real-time test. The reproducing unit 60 supports various vibrators to independently operate each vibrator, such that the authoring results can be realistically tested.

As described above, the present invention uses the existing form of the music score to author the vibration score, such that someone with basic knowledge on music can facilitate learning and easily and quickly author the vibration. In addition, the present invention configures the graphic user interface that facilitates the intuitive recognition to easily discern the three-dimensional information on the frequencies, amplitudes, and rhythms to author the vibration quickly. Moreover, the present invention can easily infer the effect of the generated vibration of the expression of the score form.

The vibration authoring method according to the exemplary embodiment of the present invention includes: defining a scale by controlling the frequencies, amplitudes, and waveforms of the vibration; defining a clef by corresponding the selected frequencies to each staff line of the vibration score by selecting a portion of the frequencies and the amplitudes that configure the defined scale and corresponding the selected amplitudes to head numbers of each note; authoring a score by designating specific clefs of the defined clefs and by inputting symbols including notes, rests, and dynamic marks in the vibration score; and reproducing the authored score. At this time, the products of each step, that is, the scale, the clef, and the score are preferably stored in the XML file format.

FIGS. 4 to 6 are diagrams for explaining one example where the vibration score is authored.

The vibration score of FIG. 4 is one example that authors the vibration representing 'delete folder'. In order to author portion a of FIG. 4, Clef 1 and Clef 2 are used and Clef 1 and Clef 2 are shown in FIG. 5. Clef 1 is a sine waveform having a low amplitude range (0.0027 to 0.0047) and Clef 2 is a sine waveform having a relatively higher amplitude range (0.0477 to 0.7351). The Clef 1 and 2 have the same frequency groups and the intensity of the amplitude is exponentially increased. The tempo is set to be sufficiently small (0.15 second) in order to reproduce the continuously changed waveform.

FIG. 6 is a graph showing the vibration score of FIG. 4 as waveforms. Portion a has the same frequency (100 Hz) since all the notes are positioned at the same staff line (second from below) as shown in FIG. 4. However, in the case of the amplitude, since the first bar of portion a designates Clef 2, the head number moves from 9 to 2 such that the amplitude is reduced from 0.7351 to 0.0634, and since the second bar designates Clef 1, the head number moves from 9 to 2 such that the amplitude is reduced from 0.0447 to 0.0039. As a result, the waveform of portion a has the exponentially reduced amplitude as shown in FIG. 6.

Meanwhile, the present invention can be implemented as a computer-readable code in a computer-readable recording medium. The computer-readable recording media includes all types of recording apparatuses in which data readable by a computer system is stored.

Examples of the computer-readable recording media include a ROM, a RAM, a CD-ROM, a magnetic tape, a floppy disk, an optical data storage etc., and in addition, include a recording medium implemented in the form of a carrier wave (for example, transmission through the Internet). Further, the computer-readable recording media are distributed on computer systems connected through a network, and thus the computer-readable recording media may be stored and executed as the computer-readable code using a distribution scheme. Further, functional programs, codes, and code segments for implementing a method of receiving broadcast can be easily inferred by programmers in the related art.

The spirit of the present invention has just been exemplified. It will be appreciated by those skilled in the art that various modifications, changes, and substitutions can be made without departing from the essential characteristics of the present invention. Accordingly, the embodiments disclosed in the present invention and the accompanying drawings are used not to limit but to describe the spirit of the present invention. The scope of the present invention is not limited only to the embodiments and the accompanying drawings. The protection scope of the present invention must be analyzed by the appended claims and it should be analyzed that all spirits within a scope equivalent thereto are included in the appended claims of the present invention.

INDUSTRIAL APPLICABILITY

The present invention can be widely applied to the haptic field, in particular, the vibration authoring and reproducing field.

The invention claimed is:

1. A vibration authoring tool, comprising:

a scale defining unit that defines a scale by controlling the frequencies, amplitudes, and waveforms of the vibration;

a clef defining unit that defines a clef by corresponding each staff line of a vibration score to a portion of the frequencies and head numbers of each note to a portion of the amplitudes;

a score authoring unit that authors a score by inputting symbols including notes, rests, and dynamics in the vibration score; and a reproducing unit that reproduces the score authored through the score authoring unit.

2. The vibration authoring tool according to claim 1, further comprising a storage unit that stores authoring results of the score authoring unit in an eXtensible Markup Language (XML) file format.

3. The vibration authoring tool according to claim 1, wherein the clef defining unit defines a tempo that represents a temporal length of a quarter note by a second unit.

4. The vibration authoring tool according to claim 1, wherein the score authoring unit represents the amplitudes of the vibration through the head numbers of the notes, the frequencies of the vibration depending on the positions on the staff lines of the notes, and the rhythms of the vibration through the notes and rests.

5. The vibration authoring tool according to claim 1, wherein the score authoring unit includes a clef designating unit that designates any one of the clefs that are defined in the clef defining unit.

6. A vibration authoring method, comprising:

(a) defining a scale by controlling the frequencies, amplitudes, and waveforms of the vibration;

(b) defining a clef by corresponding selected frequencies to each staff line of a vibration score by selecting a portion of the frequencies and the amplitudes that configure the scale defined through step (a) and corresponding the selected amplitudes to head numbers of each note; and (c) authoring a score by designating specific clefs of the clefs defined through step (b) and by inputting symbols including notes, rests, and dynamic marks in the vibration score.

7. The vibration authoring method according to claim 6, further comprising (d) reproducing the score authored through step (c).

8. The vibration authoring method according to claim 7, further comprising storing the scale defined through step (a), the clef defined through step (b), and the score authored through step (c) in an XML file format.

9. The vibration authoring method according to claim 6, wherein step (c) represents the amplitudes of the vibration through the head numbers of the notes, the frequencies of the vibration depending on the positions on the staff lines of the notes, and the rhythms of the vibration through the notes and rests.

10. A computer-readable storage medium recorded with the vibration authoring method according to claim 6.

* * * * *